(12) United States Patent
Arnaud et al.

(10) Patent No.: US 10,574,344 B2
(45) Date of Patent: Feb. 25, 2020

(54) METHOD AND SYSTEM FOR TRANSPORTING SIGNALS IN A SATELLITE SYSTEM

(71) Applicant: THALES, Courbevoie (FR)

(72) Inventors: Mathieu Arnaud, Toulouse (FR);
Jean-Luc Almeida, Toulouse (FR);
David Arnaud, Le Bouscat (FR);
Cédric Baudoin, Toulouse (FR);
Jacques Decroix, Toulouse (FR);
Erwan Corbel, Toulouse (FR)

(73) Assignee: THALES, Courbevoie (FR)

( * ) Notice: Subject to any disclaimer, the term of this patent is extended or adjusted under 35 U.S.C. 154(b) by 143 days.

(21) Appl. No.: 15/886,762

(22) Filed: Feb. 1, 2018

(65) Prior Publication Data

US 2018/0219613 A1    Aug. 2, 2018

(30) Foreign Application Priority Data

Feb. 2, 2017    (FR) ..................... 17 00106

(51) Int. Cl.
*H04B 7/185* (2006.01)
*G06F 1/14* (2006.01)
*H04L 12/46* (2006.01)
*H04N 21/436* (2011.01)

(52) U.S. Cl.
CPC ........... *H04B 7/18526* (2013.01); *G06F 1/14* (2013.01); *H04B 7/18517* (2013.01); *H04L 12/4633* (2013.01); *H04N 21/43607* (2013.01)

(58) Field of Classification Search
None
See application file for complete search history.

(56) References Cited

U.S. PATENT DOCUMENTS

| | | | |
|---|---|---|---|
| 2004/0028162 A1 | 2/2004 | Skahan et al. | |
| 2004/0213367 A1* | 10/2004 | Han | H04B 7/2693 375/354 |
| 2011/0076945 A1* | 3/2011 | Chang | G06F 1/06 455/41.2 |
| 2014/0165097 A1* | 6/2014 | Chase | H04N 21/23424 725/36 |
| 2015/0078250 A1* | 3/2015 | Mineta | H04J 13/10 370/320 |
| 2015/0215031 A1 | 7/2015 | Dalvi et al. | |
| 2017/0350984 A1* | 12/2017 | Nishi | G04R 20/02 |
| 2019/0123811 A1* | 4/2019 | Potter | H04B 7/0426 |
| 2019/0199428 A1* | 6/2019 | Regunathan | H04B 7/18515 |

* cited by examiner

*Primary Examiner* — Otis L Thompson, Jr.
(74) *Attorney, Agent, or Firm* — Baker & Hostetler LLP

(57) ABSTRACT

A data transmission system in a communication network comprising a data modulator comprises: a first part at the level of the collection point part comprising: an NCR module taking account of an external absolute time reference to reconstitute a network clock, a transmitter module receiving the value of a time reference to be inserted into the data packet to be transmitted and transmitting to the NCR module an information item on an instant of synchronization for the receiver, a second part at the level of the radiofrequency part of a gateway comprising; a receiver module, a module for reconstructing a clock locally, a module for inserting a time reference into a data packet received by the receiver before transmission of the data via the satellite, the first part and the second part exchange encapsulated data.

10 Claims, 5 Drawing Sheets

METHOD AND SYSTEM FOR TRANSPORTING SIGNALS IN A SATELLITE SYSTEM

CROSS-REFERENCE TO RELATED APPLICATIONS

This application claims priority to foreign French patent application No. FR 1700106, filed on Feb. 2, 2017, the disclosure of which is incorporated by reference in its entirety.

FIELD OF THE INVENTION

The invention relates to a system and a method for transmitting signals in a satellite system. It falls in particular in the context of the satellite user networks for the transmission of radiofrequency signals.

BACKGROUND

The increase in bit rates, particularly in the context of the so-called VHTS (Very High Throughput Satellite) satellites, is leading to the proliferation of infrastructures with maintenance and interconnection costs which are correlated. For reasons of the requirements of capacity and therefore of frequency resources, it is necessary to use increasingly higher frequency bands (Q/V of the electromagnetic spectrum) comprising attenuation variations linked to the significant meteorological conditions. When the meteorological conditions are too degraded, it is necessary to use a site diversity strategy consisting in passing through another anchorage site known as "gateway". A gateway is located at various points under the coverage of a satellite. The site diversity consists in using places sufficiently far apart for the correlation between the meteorological conditions to be negligible. The drawback resulting therefrom is the proliferation of the locations and therefore of the infrastructures with the attendant increase in costs.

FIG. 1 illustrates a user network 1 according to the prior art in which a hub 10 and an RF module 11 are collocated in a gateway 12. Such an architecture results in significant gateway sizes because the latter have to be dimensioned to be able to distribute the maximum capacity to the satellite. Furthermore, the traffic must be rerouted from one gateway to another in case of site diversity.

SUMMARY OF THE INVENTION

The idea implemented in the present invention consists notably in locating the hubs at the level of a collection point, better known in the satellite field by the abbreviation PoP, thus reducing the size of the gateways which retain only the RF part, in normal operation.

The invention relates to a data transmission system in a communication network comprising a satellite transmission link, a service provider part, a user part and a satellite access network comprising a collection point PoP adapted to despatch the data flows, several gateways comprising the radiofrequency part, characterized in that it comprises a modulator of data to be transmitted comprising at least two parts:
a first part positioned at the level of the collection point PoP part and comprising the following modules:
an NCR module adapted to take account of an external absolute time reference to reconstitute a network clock for a synchronization in the transmission of the data,
a transmitter module receiving the value of a time reference to be inserted into the data packet to be transmitted and transmitting to the NCR module an information item on an instant of synchronization for the receiver,
a second part positioned at the level of the radiofrequency part of a gateway and comprising the following modules:
a receiver module,
a module for reconstructing a clock locally, from the synchronization information contained in the transmitted data,
a module for inserting a time reference into a data packet received by the receiver before transmission of the data via the satellite,
the first part and the second part exchange encapsulated data according to the protocol used for the transmission in the system.

The system can comprise a demodulator composed of two parts:
a first part situated at the level of the gateway part of the system comprising the following modules:
a module for reducing the number of bits transporting the information item, before transmission via a transmitter module,
a second part situated at the level of a collection point PoP and comprising at least the following module:
a receiver module.

The receiver module of the part situated at the radiofrequency level of a gateway is, for example, adapted to generate the following information: an information item on the latency of the data transmission link, an information item on the triggering of the transmission of the data H.F.Rx trigger, an information item H.F.Rx NCR corresponding to the value of a time corresponding to the start of a hyper frame to be taken into account on reception of the "H.F.Rx trigger" information item in order to reconstitute, locally at the level of the radiofrequency part, a clock corrected of the transmission latency between the first part and the second part of the modulator.

The clock reconstitution module is, for example, adapted to reconstitute a network synchronization and for supplying a current time to be inserted into a data field of a hyper frame under construction.

The "front-end" part can additionally comprise the following elements:
a module for adapting the data flow,
a coding module,
a mapping module adapted to transform the data in the form of coded bits into symbols,
a module adapted to insert a header and pilots,
a digital data modulation module,
a tuner module, and
an M&C handler module ensuring the configuration and the monitoring of the various elements of the modulator.

The modulator can be a modulator of DVB-S2 type, or of DVB-RCS2 type. The protocol implemented is for example the CPRI protocol.

The invention relates also to a method for transmitting signals in a communication network comprising a satellite transmission link comprising a service provider part, a user part and a satellite access network comprising a collection point PoP adapted to despatch the data flows, several gateways comprising the RF part, comprising at least the following steps:
a part situated at the level of a collection point of the system constructs a baseband frame comprising a data field including synchronization information and/or an identifier of a user and a field containing data originating from a service provider and intended for the user, in order to generate encapsulated data before transmission to a second part of the system suitable for modulating said data, the second part reconstructs a local clock from the synchronization information contained in the encapsulated data, before modulation of the data, the modulated data are then transmitted by satellite.

The method can comprise a step of reconstruction of a clock value by taking account of the value of the latency of the transmission link, of the instant of triggering of transmission of the data, of the value of a time corresponding to the start of a received hyper frame.

The data format is the CPRI format for the transmission of the encapsulated data or even the DVB-S2 frame format.

BRIEF DESCRIPTION OF THE DRAWINGS

Other features and advantages of the present invention will become more apparent on reading the following description of exemplary embodiments given in an illustrative and in no way limiting manner, with figures attached which represent.

DETAILED DESCRIPTION

In order to give a good understanding of the invention, the following example is given in the context of a user network implementing a radiofrequency RF transport and an interface known to the person skilled in the art by the acronym CPRI (Common Public Radio Interface) and for a modulator of DVB-S2(x) type and a demodulator of DVB-RCS2 type that are known to the person skilled in the art. Without departing from the scope of the invention, any person skilled in the art will be able to adapt the modules explained hereinbelow for the implementation thereof in a satellite system whatever the transmission and modulation/demodulation protocol used.

Figure 1:
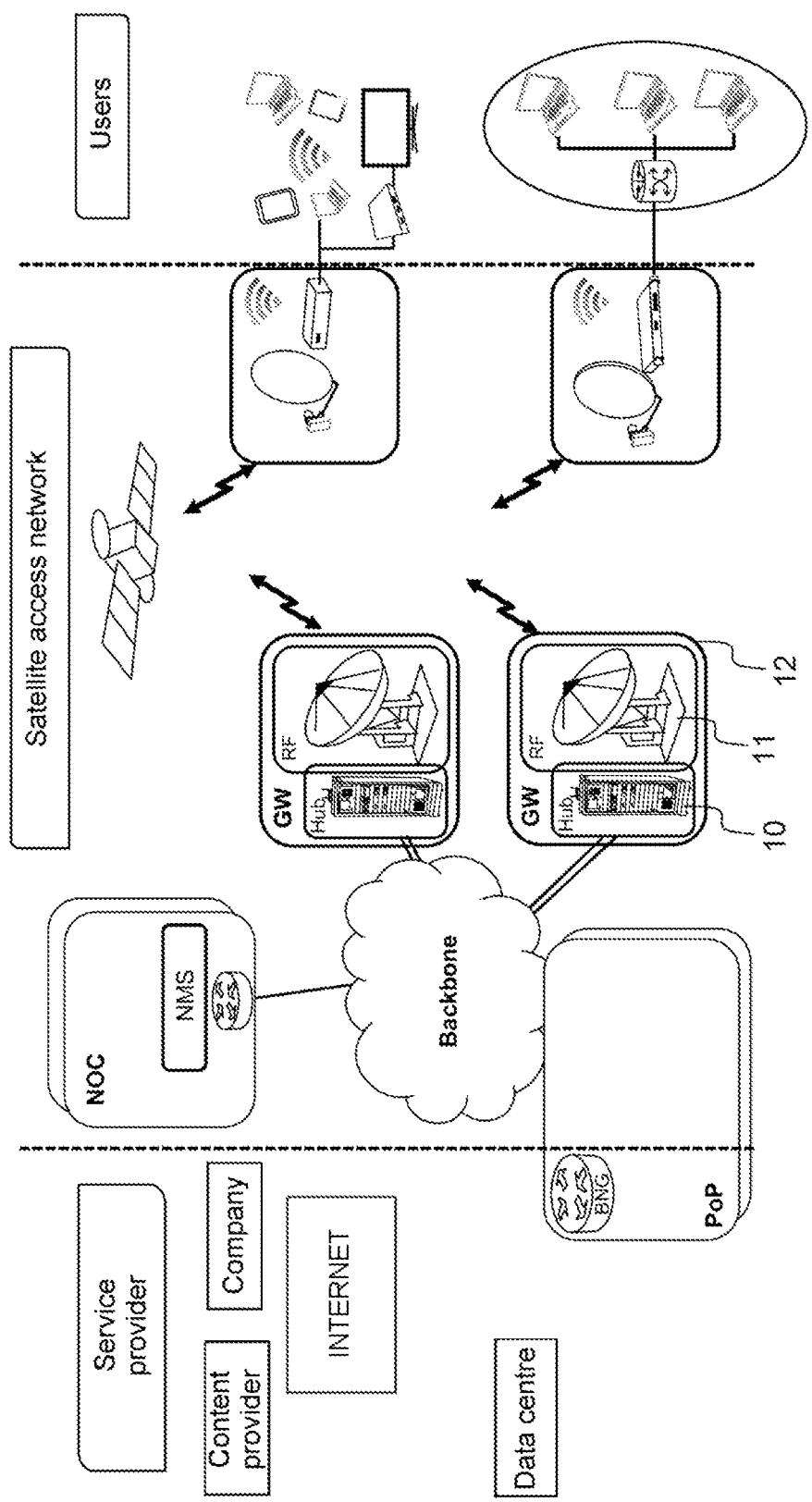
FIG. 1, a diagram of a network according to the prior art.
Figure 2:
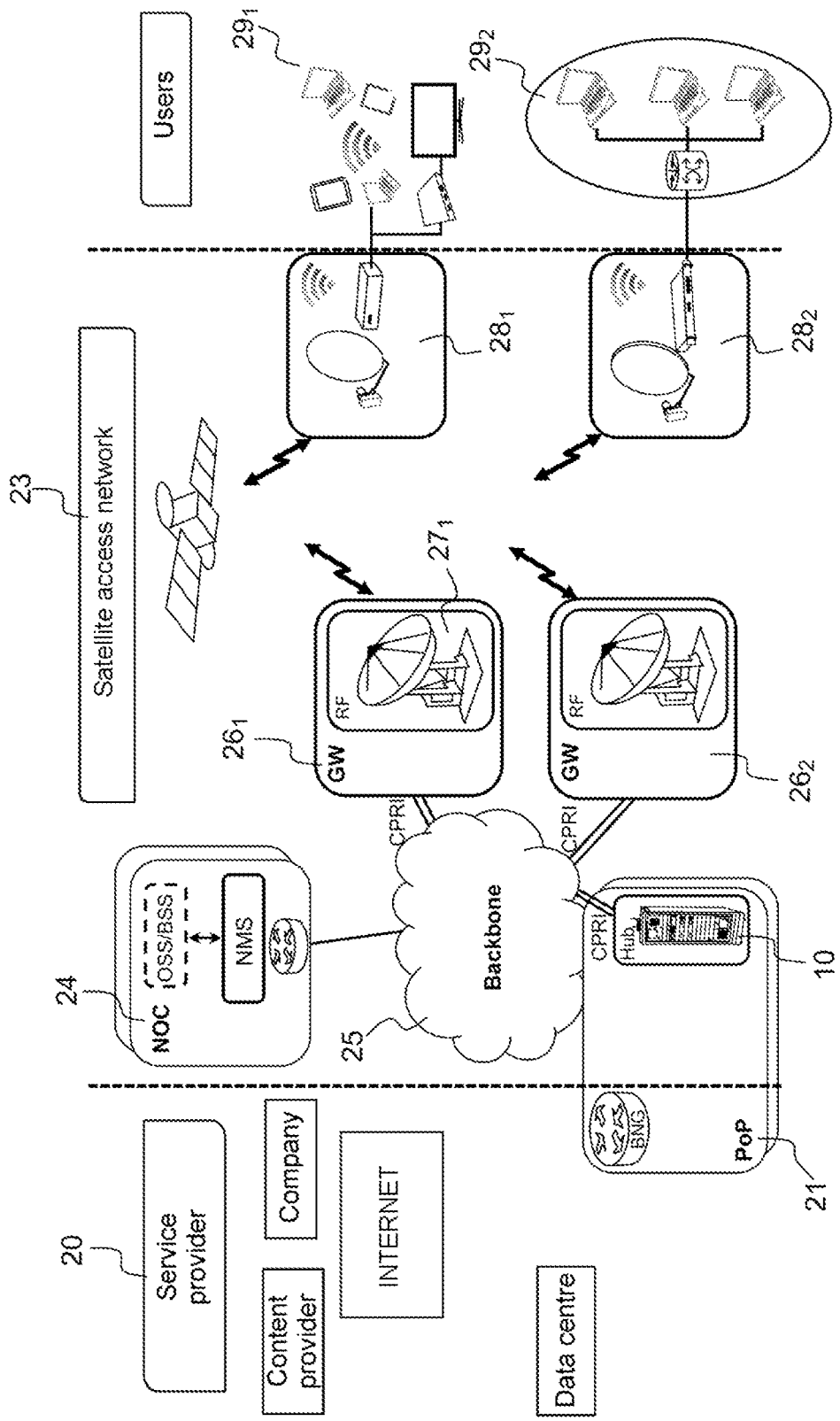
FIG. 2, an example of network architecture according to the invention.

FIG. 2 illustrates an example of architecture according to the invention comprising a service provider part 20 which will not be detailed because its operation is known to the person skilled in the art, a module 21 or collection point PoP whose particular function is to despatch the data flows from the providers to the users, via the gateways. This collection point module, PoP, will include the various hubs usually located in the prior art at the level of the gateways. The satellite network part, 23, is organised around the operator "backbone" 25 which makes it possible to pass the data between the PoP, 21, and the gateways $26_1$, $26_2$, but also the management information between one or more network operations centres NOC 24 which, linked to the various gateways, allow the management of the satellite-based access system. In normal operation of the device according to the prior art, in the gateways 26j, there is the hub part 10 which communicates with the RF part 27j which communicates via the satellite ST to reception terminals 28k linked to different users 29l.

The base idea of the invention is notably to subdivide the modulator and the demodulator used in the satellite system at the level of the collection point PoP and at the level of the gateways of the system in order to minimize the bit rate needed for the transmission of the data.

Since the hub parts 10 are positioned at the level of the collection point PoP, they will be able to be pooled. In effect, a gateway in the prior art is dimensioned by considering the worst case (maximum number of requests and of simultaneous throughputs originating from several users); thus, the sum of the capacity of the various gateways would be far greater than that of the satellite. In the case of the method according to the invention, the colocation of the hubs 10 at the level of the collection point PoP, 21, allows the hubs 10 to be dimensioned strictly to the capacity of the satellite.

Figure 3:
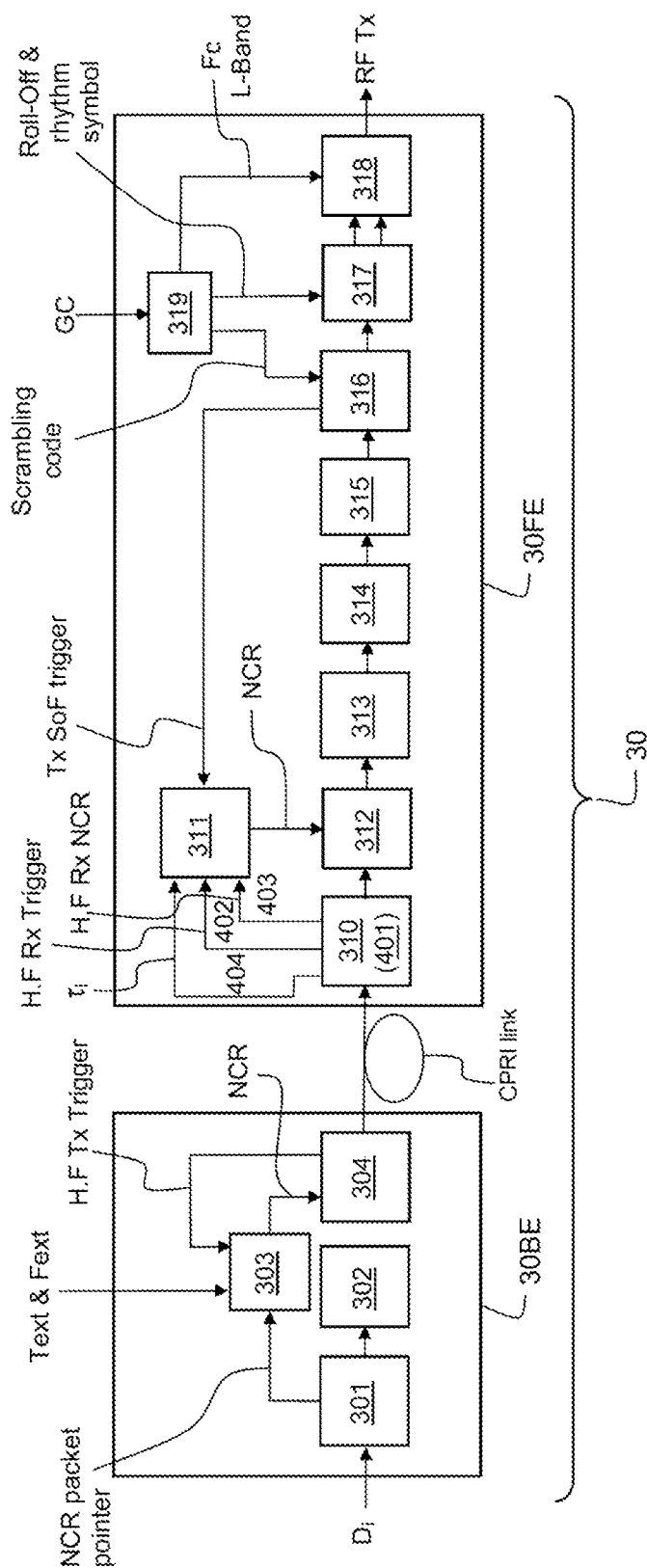
FIG. 3, an example of architecture of the modulator according to the invention.

FIG. 3 illustrates a modulator 30 example according to the invention which is distributed between the collection point PoP and a gateway. A first part or back-end 30BE is situated at the level of the hub 10 and a front-end part 30FE is located in the RF module 27j. The idea consists in particular in transporting the baseband frame or BB frame over the CPRI link. This frame comprises a data field including synchronization and/or identification information (identifier) of the calling party or the user and a field for data from the service provider to be transmitted to a calling user.

The back-end part 30BE comprises at least the following elements:
  a traffic manager module, or traffic handler 301, which receives the data Di to be modulated over an ad-hoc interface, for example GbE, known to the person skilled in the art,
  a mode adaptation module 302, the content of which is, for example, described in paragraph § 5.1 of the document ETSI EN 302 307 defining the DVB-S2 standard in its version 1.4.1. Its role is to prepare the data Di in order to be able to insert them into the header part BB-header,
  an NCR module 303 which takes account of an external absolute time reference text to reconstitute a network clock NCR (Network Clock Reference) to allow a synchronization of the various equipment items of the access network, in particular the sending of the RCS2 frames by the terminals in order to be able to implement a time-multiplexed access. At the start of a new CPRI hyper frame to be sent, indicated by the trigger parameter "H.F Tx Trigger" explained hereinbelow, this NCR module provides the current NCR time (corresponding to a given instant, time information) in order for it to be inserted into the proprietary data field of the hyper frame currently being constructed,
  a CPRI transmitter module 304: this module receives the value of the NCR time to be inserted into the data packet to be transmitted which will allow the synchronization and the reading of the data and transmits to the NCR module 303 an $H.F.T_x$ trigger information item on the instant of synchronization $t_{sync}$ for the receiver.

The operation of these various modules will be described later.

The front-end part 30FE comprises the following modules:
  a CPRI receiver module 310 which transmits several information items to a module for reconstructing an NCR clock, necessary for the synchronization and the reading of the data; these information items contain an information item on the latency τ of the transmission link, an information item on triggering reception of the start of a new data hyper frame, H.F.Rx trigger, an H.F.Rx.NCR information item which corresponds to the NCR value (NCR time) corresponding to the start of the hyper frame received and therefore to be taken into account on reception of the "H.F Rx trigger" in order to locally reconstitute the NCR clock corrected of the transmission latency; the receiver module also transmits the radiofrequency digital data transmitted by the back-end part, a module for reconstructing the value of the NCR local clock, 311, from the synchronization information contained in the data packet received by the CPRI receiver (value of the time and value of the latency), a module, 312, for inserting the exact time (NCR value) into a data packet, as is described, for example, in paragraph § 6.2.1 of ETSI EN 301-545-2, a data flow adaptation module, 313, the operation of which is, for example, described in paragraph § 5.2— ETSI EN 302 307. Its role is to apply a padding of the frame, if necessary, and to insert a header BB-header. The data to be transmitted are thus scrambled at this level, a coding module 314: the content of this block is described in paragraph § 5.3—ETSI EN 302 307. Its role is to encode the data with an error correcting code. In the context of the DVB-S2(x) transmission standard, it is a BCH code followed by a low density parity checking code or LDPC (Low Density Parity Code), a coherency or mapping module 315: the content of this block is described in paragraph § 5.4—ETSI EN 302 307. It transforms the data in the form of encoded bits into symbols as a function of the type of constellation desired. In some cases, an interleaving of the data is added, a PL-framing module 316: the content of this block is described in paragraph § 5.5—ETSI EN 302 307. It inserts a header, optional pilots and proceeds with a dispersion of the energy by using a spreading code, a digital data modulation module 317 which formats the signal using a root raised cosine filter, for example, and proceeds according to the symbol bit rate of the transmission protocol with a bit rate conversion in order to feed a digital/analogue converter, a tuner module 318: the signals at the output of the digital/analogue converter DAC are transposed into intermediate frequency in order to be transmitted to the users, RF $T_x$, a control and management module 319, M&C handler, ensuring the configuration and the monitoring of the various elements of the modulator. This module receives the control and management information.

The management of the clock and synchronization information (time inserted into the data frame and latency) for the modulator part situated at the level of the back-end and for the modulator part situated at the level of the front-end will now be described. The CPRI transmitter module, 304, will encapsulate the data Di to be transmitted by observing the CPRI format. This format comprises a first part comprising an NCR information item (information for the synchronization of the various receivers) and data Di to be transmitted to the front-end part to be modulated.

The encapsulated data are transmitted via a CPRI link at the level of one or more gateways as a function of the user requests. An example of a scheme for pooling of the hubs and of the gateways is given hereinbelow in the description.

The transmission of the digitized RF signals will take place over the CPRI link thus avoiding the use of RF cables for the transmission of the data, the CPRI standard in its version 6.1 being defined by the consortium of the same name on the website www.cpri.info.

FIG. 3 also illustrates the steps of reconstruction of the NCR value.

On the back-end side (30BE), a signal triggering reception of the Rx data (H.F. Rx trigger) is generated by the CPRI reception module 310 at the start of the hyper frame, 401. It is sent by the CPRI transmitter block to the NCR reconstruction module 311. This signal is accompanied by the value of the NCR time recovered from the part "emanating from the provider" extracted from the data to form the "H.F. Rx NCR" signal.

The instant of arrival $t_a$ of the data packet is signalled by a signal "H. F. Rx trigger", 402, as well as the corresponding NCR time value by "H.F. Rx NCR", 403. These two signals (value of the time and instant of arrival of the data packet) allow the reconstruction module "local NCR reconstruction" 311 to locally reconstitute the NCR clock using a loop of digital PLL type, for example.

By using the native function of the CPRI that makes it possible to measure the latency between the two ends of the transmission chain (instant of transmission—instant of reception on the receiver side of the modulator), this local value of the NCR clock $NCR_{local}$, can be compensated $NCR_{comp}$ to represent a value identical to the value of the clock at the level of the back-end. This information is passed from the "CPRI receiver" block to the "local NCR reconstruction" block by the "link latency" signal, $\tau_l$, 404.

Ultimately, this reconstituted NCR clock will be able to be used for the insertion of an NCR time into the DVB-S2(x) frames according to the recommendations of the DVB-RCS2 standard (§ 6.2.1) known to the person skilled in the art.

The CPRI format is for example used in the eight-bit I&Q format (phase and phase quadrature). The data from a back-end to a front-end are encapsulated in a 16-bit A×C container, for example, by using the format indicated. This will make it possible in particular to be able to transport the data from several back-ends to the respective front-ends over one and the same physical CPRI link by multiplexing, in the same CPRI flow, the data intended for several front-ends. The containers of the data are for example coded consecutively in the CPRI hyper frames and filling or "padding" data are added at the end of the hyper frame if it is not completely filled.

For each A×C container, two control words are added to the "vendor specific" data defined by the CPRI standard.

These two words are for example subdivided as follows, starting from the least significant bit LSB of the second word:

12 bits give the distance in 16-bit words between the start of the A×C container and the next header BB-header, 17 bits indicate the size of the A×C container in 16-bit words, the remaining bits indicate the logical number of the A×C container.

The descriptor of a DVB-S2(x) A×C container can be represented as follows:

| Back-end Transmitter identifier (n bits) | A × C container size (17 bits) | BB-header position in A × C container (12 bits) |
|---|---|---|

The indication of the number of bits remaining makes it possible to add and remove, on the fly, on a CPRI link, the flows originating from different back-ends.

The size of the A×C containers makes it possible to delimit them in the hyper frame. Finally, the distance to the next header BB-header allows, upon the starting up of the link, a synchronization on the boundaries of the BB-frames. In effect, when the first BB-frame is found, the DFL fields of the BB-header make it possible to determine the next frame and so on to the end of the A×C container.

Figure 4:
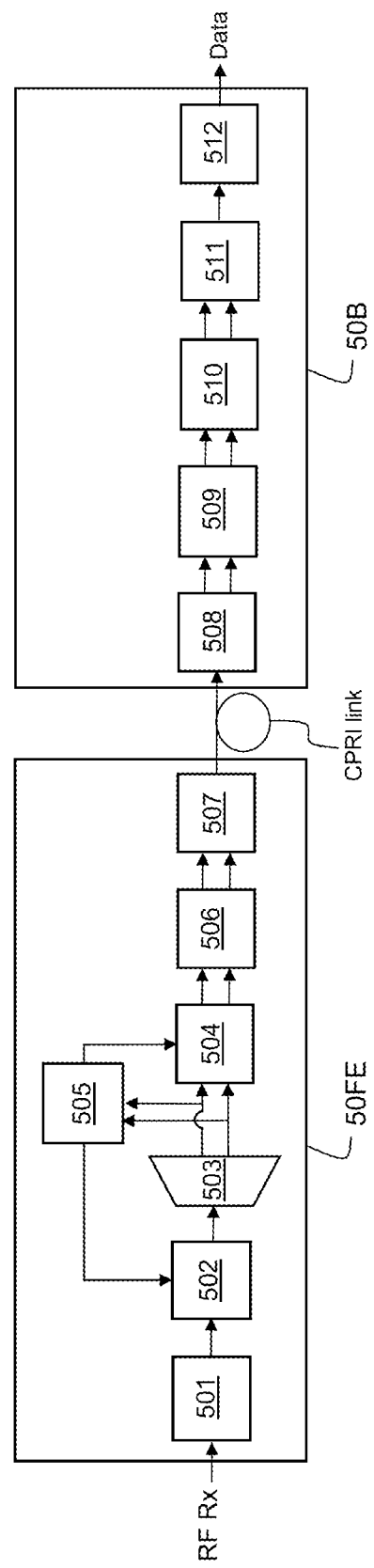
FIG. 4, an example of architecture of the demodulator according to the invention, and FIG. 5, an example of pooling of the modules.

FIG. 4 illustrates an example of a demodulator 50 according to the invention which is distributed between the back-end 50BE and the front-end 50FE. This demodulator example makes it possible to process a waveform of DVB-RCS2 type defined by the standard ETSI EN 301 545-2 in its version 1.2.1. It is a waveform of MFTDMA (Multiple Frequency Time Division Multiplexing Access) type. That means that each transmitter sends a quantity of coded data called a burst and that these bursts are multiplexed in frequency and in time according to a system of frequency and time grids called frames.

At the level of the front-end part 50FE, the device for example comprises the following elements:
- a tuner 501 which receives the RF signal $R_x$ containing the data and the synchronization information and adds it to a specific band that can be digitized according to techniques known to the person skilled in the art,
- an automatic gain control AGC module, 502, which makes it possible to adjust the level of the signal in order to optimize its level and optimize the digital quantization which will be done by an analogue/digital converter ADC 503, transforming the analogue signal into a digital signal,
- a gain adjustment module, 504, which normalizes the amplitude of the signal in order for the maximum amplitude of the signal to be coded by the maximum allowable value,
- a dynamic signal-to-noise ratio SNR measurement module, 505: the level of the signal digitized by the analogue-digital converter ADC as well as the signal-to-noise ratio of the decoded bursts are measured and used to generate a setpoint to the AGC module and the gain adjustment module. In the case of a multicarrier demodulator, the noise level is estimated and a backoff in relation to the full scale of the ADC is taken into account to both take account of the maximum dynamic range of the spectral density of the useful signals compared to that of the noise, of the error on the power correction of the bursts and of the peak average power ratio PAPR envisaged,
- a bitwise manipulation reduction module, 506, which allows the reduction of the number of bits transporting the information. The most significant bits are retained,
- a CPRI transmitter module, 507, which will transmit the data to the collection point PoP part.

On the side of the back-end 50BE at the level of the collection point PoP of the system, the demodulator is composed of the following modules:
- a CPRI receiver, 508,
- an MF-TDMA burst extraction module, 509, of the received signal, the bursts are extracted both in the frequency and time dimensions,
- a synchronization module 510: each burst is then demodulated. For that, the first step is a time synchronization, followed by a frequency and phase synchronization,
- a demapper module, 511: the received signal is then "demapped" to extract from it the encoded bits and the synchronization symbols are removed,
- a decoder 512: the bits are decoded and descrambled in order to extract from them the corrected useful data or reject them if they cannot be corrected.

| Identifier of the back-end transmitter (n bits) | Size of the A × C container (29 bits) |
|---|---|

Figure 5:
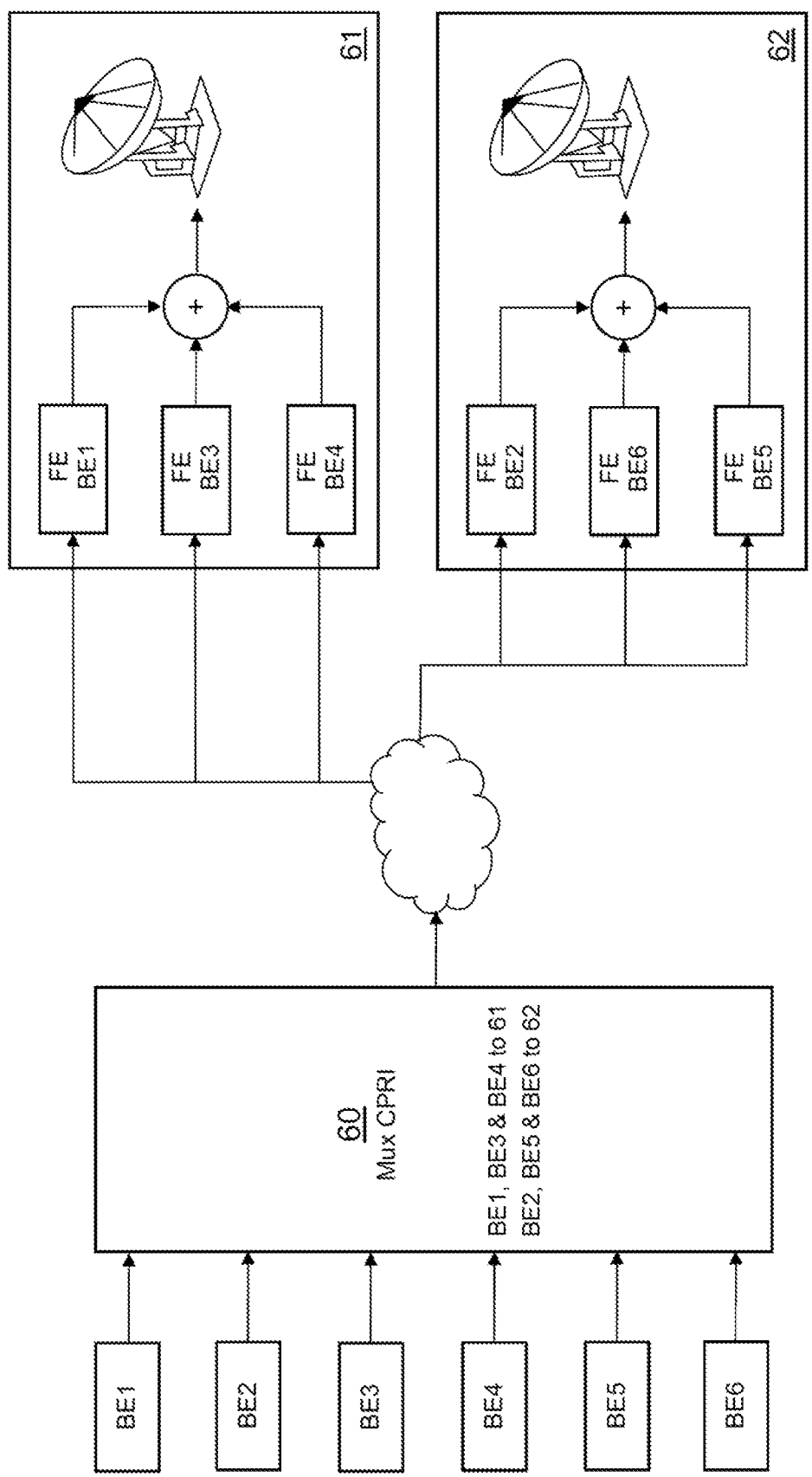

FIG. 5 describes an example of multiplexing/demultiplexing of the flows from several back-ends to several front-ends.

In the example, six BE are considered in the PoP part and use, to transmit their respective flows, the identifiers from 1 to 6. A CPRI multiplexer, 60, according to the prior art of this standard, is configured to multiplex the flows from the back-ends BE1, BE3 and BE4 in the CPRI link to the first gateway 61. Likewise, the flows from the back-ends BE2, BE5 and BE6 are sent to the second gateway 62.

On the side of the first gateway 61, three front-ends are configured respectively to process the flows identified F1, F3 and F4. Likewise, the second gateway 62 has three front-ends configured to process the flows identified F2, F5 and F6.

By virtue of the identifier of the back-end transmitter "back-end transmitter identifier", the flows are indeed multiplexed, transmitted to the respective gateways, then extracted.

When a front-end fails, it is then easy to place another front-end processing the same back-end identifier in service and to substitute this second front-end for the first.

Finally, in the case of need for geographic diversity, the CPRI multiplexer has to be reconfigured in order for the flow from a back-end to be rerouted to change destination and a front-end in the new destination gateway has to be configured with the right identifier to take account of this new flow.

ADVANTAGES

The system according to the invention makes it possible to reduce the infrastructure and maintenance costs of the gateway sites. The site diversity no longer entails changing the routing of the signals between the hub and the radiofrequency RF part.

The invention claimed is:

1. A data transmission system in a communication network comprising a satellite transmission link, a service provider part, a user part and a satellite access network comprising a collection point (PoP) adapted to despatch the data flows, several gateways comprising the radiofrequency (RF) part, comprising a modulator of data to be transmitted comprising at least two parts:
   a first part positioned at the level of the collection point PoP part and comprising the following modules:
      a network clock reference (NCR) module adapted to take account of an external absolute time reference to reconstitute a network clock for a synchronization in the transmission of the data,
      a transmitter module receiving the value of a time reference to be inserted into the data packet to be transmitted and transmitting to the NCR module an information item on an instant of synchronization for the receiver,
   a second part positioned at the level of the radiofrequency part of a gateway and comprising the following modules:
      a receiver module of the part situated at the radiofrequency level of a gateway is adapted to generate the following information: an information item on the latency of the data transmission link, an information item on the triggering of the transmission of the data high frequency receiver (H.F.Rx) trigger, an information item H.F.Rx NCR corresponding to the value of a time corresponding to the start of a hyper frame to be taken into account on reception of the H.F,Rx trigger information item in order to reconstitute, locally at the level of the radiofrequency part, a clock corrected of the transmission latency between the first part and the second part of the modulator, a module for reconstructing a clock locally, from the synchronization information contained in the transmitted data, a module for inserting a time reference into a data packet received by the receiver before transmission of the data via the satellite, the first part and the second part exchange encapsulated data according to the protocol used for the transmission of data in the system.

2. The system according to claim 1, wherein a demodulator is composed of two parts:

a first part situated at the level of the gateway part of the system comprising the following modules:

a module for reducing the number of bits transporting the information item, before transmission via a transmitter module, a second part situated at the level of a collection point PoP and comprising at least the following module:

a receiver module.

3. The system according to claim 1, wherein the clock reconstitution module is adapted to reconstitute a network synchronization and for supplying a current time to be inserted into a data field of a hyper frame under construction.

4. The system according to claim 1, comprising the "front-end" part additionally comprises the following elements:

a module for adapting the data flow,
a coding module,
a mapping module adapted to transform the data in the form of coded bits into symbols,
a module adapted to insert a header and pilots,
a digital data modulation module,
a tuner module, and
a monitoring and control (M&C) handler module ensuring the configuration and the monitoring of the various elements of the modulator.

5. The system according to claim 1, wherein the modulator is a modulator of Digital Video Broadcasting—Satellite—Second Generation (DVB-S2) type.

6. The system according to claim 1, wherein the demodulator is a demodulator of Digital Video Broadcasting—Return Channel via Satellite—Second Generation (DVB-RCS2) type.

7. The system according to claim 1, wherein the protocol used is the common public radio interface (CPRI) protocol.

8. A method for transmitting signals in a communication network comprising a satellite transmission link comprising a service provider part, a user part and a satellite access network comprising a collection point (PoP) suitable for despatching the data flows, several gateways comprising a radiofrequency (RF) part, comprising at least the following steps:

a part situated at the level of a collection point of the system constructs a baseband frame comprising a data field including synchronization information and/or an identifier of a user and a field containing data originating from a service provider and intended for the user, in order to generate encapsulated data before transmission to a second part of the system adapted to modulate said data, the second part reconstructs a local clock value from the synchronization information contained in the encapsulated data, before modulation of the data, by taking account of the value of the latency of the transmission link, of the instant of triggering of transmission of the data, of the value of a time corresponding to the start of a received hyper frame, the modulated data are then transmitted by satellite.

9. The method according to claim 8, wherein the common public radio interface (CPRI) format is used for the transmission of the encapsulated data.

10. The method according to claim 8, wherein the Digital Video Broadcasting—Satellite—Second Generation (DVB-S2) frame format is used.

* * * * *